United States Patent Office 3,796,811
Patented Mar. 12, 1974

3,796,811
METHOD OF PRODUCING A CONCENTRATED MEAT PRODUCT AND PRODUCT PRODUCED THEREBY
Heinz Huth and Hans Schum, Holzminden, Germany, assignors to Dragoco Spezialfabrik Konz, Riech- und Aromostoffe Gerberding & Co. GmbH, Holzminden, Germany
No Drawing. Filed Dec. 10, 1971, Ser. No. 206,896
Claims priority, application Germany, June 11, 1971, P 21 29 168.9
Int. Cl. A23l 1/44
U.S. Cl. 426—59                 12 Claims

ABSTRACT OF THE DISCLOSURE

This invention relates to the production of concentrated meat-like aromatics and aromatic compositions. In accordance with the invention animal body parts are comminuted, mixed with water to form a pasty mass, heated, cooled and the aqueous phase thereof is treated with a protein-splitting enzyme. Concentration of the aqueous liquid results in a concentrated aromatic product that can be added to foods, particularly for the making of so-called "convenience" foods.

BACKGROUND OF THE INVENTION

The invention relates to the production of concentrated aromatics from animal meat pieces, trimmings, and scraps, such as bones, animal fat and animal organs. Aromatic compositions have been produced from such animal parts with or without the addition of aromatics from onions, vegetables, mushrooms, spices and other seasonings. Onion aromatics which may be added to the meat aromatics of the invention are produced according to the German Pat. No. 1,239,925 and the Austrian Pat. No. 276,041. The vegetable, mushroom, and spice aromatics are produced according to the German application No. 1,927,228.

Aromatics of this type can be used in an outstanding manner to flavor and aromatize sauces, gravies, soups and ready made dishes, particularly the so-called "convenience" foods which are prepared in the form of quick, ready to eat preparations, these foods not requiring a cooking process to finish and develop the aroma thereof.

In preparations prepared in the home kitchen the so-called animal meat pieces, trimmings and scraps have been used to impart a basic aroma to such preparations as broths, sauces, gravies, and soups so that simple cooking of such portions together with vegetables and spices in a relatively large amount of water at temperatures of 100° C., or up to about 125° C. under pressure have the effect of imparting the basic aroma thereto. These unconcentrated extracts are not stable and have a tendency upon cooling to jell. However, from the standpoint of aroma, they are of excellent quality.

Various processes are known to produce such products under industrial mass production conditions in concentrated form. The process according to U.S. Pat. No. 3,368,906 for the production of bone extracts provides for the use of temperatures between 135° C. and 164° C., which is considerably higher than temperatures used in the home kitchen and thus results in the production of products with considerable taste variations. Furthermore, the extracts thus obtained are not stable. According to the process of German Pat. No. 1,283,660 temperatures of 150° C. are reached for the concentration of a bone broth which results in taste variations as compared to home kitchen produced products since the concentration of the bone brew is only achieved by thermal hydrolysis. A further disadvantage of this latter process is that in the extract it is necessary to incorporate in empirical manner raw vegetables and seasonings which, because of the lack of cooked character thereof, require a repeated cooking up of the mixture in order to develop their aroma.

Another home kitchen preparation, namely for the production of a base for gravies is produced from meat portions, for example bones. These are comminuted and mixed together with vegetables such as tomatoes, onions, fat and spices, and roasted. Subsequent to the roasting process the mixture is cooked in water and an extract produced which can be used for the aromatizing of sauces and gravies. However, this home kitchen type of preparation cannot be prepared by industrial methods and cannot be used for the production of standardized products.

SUMMARY OF THE INVENTION

In accordance with the present invention particulate animal portions are mixed with water to form a pasty mass which is then heated, cooled, separated from solid constituents and the aqueous phase is treated with a protein-splitting enzyme after which a concentrated product can be prepared for use to aromatize sauces, etc.

The method of the present invention avoids all of the difficulties of the hitherto used processes and makes it possible to provide for a rational industrial production of standardized products which have the desired aromatic character of preparations produced in the home kitchen.

It is accordingly a primary object of the present invention to provide a method of producing aromatic products from animal portions by a method which can be carried out under mass production conditions while nevertheless resulting in preparation of a home cooked character.

It is another object of the present invention to provide for the production of standardized aromatic products.

It is yet a further object of the present invention to provide for the production of concentrated meat aromatic products in a simple, easily controllable and easily reproducible manner.

Other objects and advantages of the present invention will be apparent from a further reading of the specification and of the appended claims.

With the above and other objects in view the present invention mainly comprises a method of producing concentrated meat aromatics, which comprises forming a pasty mass of comminuted animal parts and water, heating the pasty mass at temperatures of between about 95° C. and 128° C., cooling to between about 35° C. and 70° C., treating the liquid phase with protein-splitting enzymes, separation of the aqueous phase from the fat, uperizing, and concentrating.

More particularly, in accordance with the present invention meat, meat pieces, meat trimmings, meat scraps, animal organs, and like, with or without bones, are comminuted and water is added thereto during or after the comminuting to form a mass of pasty-like consistency, that is pasty material which can be pumped. This pasty-like mass is then heated, for example in an autoclave, at a temperature between about 95–128° C. and subsequently cooled to a temperature of about 35–70° C., preferably 50–55° C. The fat and aqueous phase are then separated from the solid water-insoluble residue using a suitable separating apparatus and the fat and aqueous phase is treated with a protein-splitting enzyme or enzymes to partially decompose the gelatinizing proteins. The aqueous phase may then be separated from the fat, if desired, and the aqueous phase is then uperized, preferably at a temperature of 145–160° C. and concentrated, for example in a vacuum concentrater at a low temperature to obtain a clear water-soluble concentrate which is stable at room temperature. The concentrate is prepared so as to obtain preferably at least about 60% and up to about 85%, most preferably about 74–78% of dry substance in order to obtain a concentrate which is microbiologically stable at room temperature.

For purposes of standardization it is advantageous to maintain the fat content of the mass prior to the initial heating between about 10% and 20% by weight.

All types of protein splitting enzymes can be used for the treatment of the aqueous phase, including all of the commercially available proteolytic active enzyme preparations of microbiological, animal and plant origin. These enzymes include pancreases, pepsins, etc. Among the suitable commercial enzyme preparations are "Pilzprotease P," "Pankreasproteinase A" and "Papain." The treatment of the fat and aqueous phase with the protein splitting enzyme is carried out to effect the decomposition of the gelatinizing protein to such extent that the aqueous extract can be evaporated to a concentrate which is flowable at 20° C. while containing 60–85%, preferably 74–78% of nonaqueous components. The treatment of the fat and aqueous extract with the protein splitting enzyme is preferably carried out at a temperature of about 35°–70° C., and most preferably at a temperature of about 50–55° C. The duration of the enzyme treatment is, as indicated above, mainly measured by the result obtained, namely such that the concentration to 60–85% nonaqueous components is flowable at 20° C. In time measurement this generally requires about 30–60 minutes of enzyme treatment, and most preferably about 40 minutes of enzyme treatment.

As described above, in carrying out the method of the present invention, the pastry material is heated to a temperature between about 95° and 128° C. The duration of heating is of course dependent upon the temperature and is shorter with higher temperatures within the temperature range than with lower temperatures within the range. For example, the duration of heating at about 95° C. is about 120 minutes, the duration of heating at about 110° C. is about 60 minutes, and the duration of heating at about 128° C. is about 35 minutes. It has been found that heating at these temperatures for the time periods indicated gives the best results.

The uperizing treatment according to the present invention, which follows the enzyme treatment is carried out by heating at temperatures of between about 145° C. and 160° C. for a very short time of at least about one second and up to about twenty seconds. The preferred heating time for this purpose is about ten seconds.

In preparing the initial pasty mass for treatment in accordance with the present invention the ratio of meaty material to water is preferably between about 1:0.5 part by weight to about 0.5:1 part by weight and most preferably the ratio is about 1:1 part weight.

As indicated above, it has been found to be of advantage to standardize the portion of fat in the comminuted meat mass to obtain a standardized product, since the aroma formation is influenced by the reaction of the aqueous phase with the fat phase.

The water-soluble aromatics produced according to the present invention can be directly used as an aromatic composition, or the aqueous concentrate can first be combined with separated fat portion, or the aqueous concentrate can be emulsified with the fat portion and the emulsion then subjected to a roasting process. Depending upon the selected temperature and the duration of heating the obtained aromatic has varying aroma characteristics. Thus, the roasting character is taken on at constant duration of heating with increasing temperature whereby a marked roasting reaction sets in at a temperature above about 100° C., while at above about 150° C. a burnt smelling and tasting product is obtained. Within this temperature range of about 100° C. to about 150° C., the duration of heating time in proportion to the heating temperature to obtain qualitatively similar aromatics is substantially inversely proportional to each other. For example, the following heating temperatures and heating times result in substantially similar aromatics:

| Heating Temperatures: | Duration of Heating, min. |
|---|---|
| 120° C | 30 |
| 130° C | 20 |
| 140° C | 10 |
| 110° C | 50 |

Aromatic compositions of varying aromatic character can be produced according to the present invention by mixing or emulsifying the aqueous concentrate of meat aromatics produced according to the invention together with fat, spice extract and vegetable extract which are obtained according to the methods of German Pat. No. 1,239,925 or Austrian Pat. No. 276,041 and German application No. 1,927,228, and subsequent heating. In this manner it is possible to produce roast meat aromas with seasoning characteristics. Additional aromatic nuances can be obtained by adding ethereal spice oils, spice extracts and other seasoning substances, for example, yeast extracts and protein hydrolysates. The adding of these aromatic nuances can be obtained in manners known to those skilled in the art.

It is to be understood that the method of the present invention is applicable to all edible animals and poultry including cows, pigs, sheep, chickens, turkeys, etc. All animals parts and organs which can possibly be made edible can be subjected to the treatment according to the present invention.

DESCRIPTION OF PREFERRED EMBODIMENTS

The following examples are given to further illustrate the present invention. The scope of the invention is not, however, to be limited to the specific details of the examples.

EXAMPLE I 1000 kg. of deep frozen chicken parts are comminuted into small pieces in a bone bucket and by the addition of about 700 kg. of water worked up into a pumpable pasty mass. The fat content of the mass amounts to about 9.2% and is standardized to 12% by the addition of about 4.8 kg. of fresh chicken fat. The mass is subsequently heated in an autoclave to 125° C. and maintained at this temperature for 40 minutes after which it is cooled to about 50° C. and the insoluble residue is pressed out by means of a packet press. There is thus obtained 42.0 kg. of residue and 128.0 kg. of an oily-aqueous emulsion to which there is added, for the purpose of decomposing the gelatinizing protein, 0.08 kg. of pancrease-proteinase, for example, the product Type A/1 of the firm. The mixture is treated for 1 hour at 40° C. and the emulsion is then subjected to centrifuging to separate the fat phase from the water phase, as well as to remove remaining insoluble residue. There is thus obtained 19.5 kg. of fat.

The aqueous phase is subsequently subjected to enzyme inactivation and sterilization in a flow through heater continuously for about 2 seconds at about 145° C. and then for several seconds cooled to about 60° C. and then evaporated in a vacuum evaporator under a vacuum of about 42 torr and a vapor temperature of about 35° C.

to a nonaqueous (dry substance) of about 78%. The yield amounts to 4.70 kg. The obtained extract is without substantial turbidity soluble in water.

5 g. of the aqueous, concentrated extract are mixed together with 20 g. of the obtained fat in 1 liter of water at 70° C. with 0.5% cooking salt. The preparation smells and tastes remarkably like chicken broth.

EXAMPLE II 60 kg. of the aqueous concentrate obtained according to Example I are emulsified together with 40 kg. of the fat of Example I in a high pressure, homogenizing machine and divided into several parts which are separately introduced into an autoclave and heated at different temperatures for a constant time period of 30 minutes and then quickly cooled to room temperature. The selected temperatures were 110° C., 120° C., 130° C. and 140° C. 20 g. of each of the obtained products were dissolved in 1 liter of 0.5% salt solution at 70° C. and tested by means of the human senses. The following results were obtained:

| Treatment Temperature: | Results |
|---|---|
| 110° C. | Stronger odor and taste impression than in the case of the unheated sample, typically like cooked chicken broth. |
| 120° C. | Typical odor and taste of roast chicken. |
| 130° C. | Strong roast chicken character. |
| 140° C. | Strong roast chicken character with burnt aftertaste. |

EXAMPLE III 500 kg. of beef bones and 500 kg. of swine bones are coarsely comminuted in a bone breaker and subsequently passed through a meat grinder with 100 kg. of fat beef meat and 600 liters of water. The pumpable pasty mass is mixed with 22 kg. of beef fat to adjust the fat content thereof to 10%. The mass is then heated in an autoclave for 60 minutes at 120° C., then cooled to about 60° C. and in a screw press the insoluble residue is continuously pressed out. The resulting liquid is then further worked up as described in Example I. The yield amounts to 152 kg. of fat and 105 kg. of aqueous concentrate.

EXAMPLE IV

The following mixture is warmed to 50° C. and treated in a colloid mill:

| | Kg. |
|---|---|
| Roast onion aroma produced according to German Pat. 1,239,925 | 10.0 |
| Raw onion aroma produced according to Austrian Pat. 276,041 | 15.0 |
| Paprika extract from dried paprika shells | 0.5 |
| Tomato concentrate, double | 22.5 |
| Aqueous concentrate of Example 3 | 27.0 |
| Fat of Example 3 | 25.0 |
| | 100.0 |

The emulsion is subsequently heated in an autoclave at 125° C., maintained at this temperature for 20 minutes then cooled to room temperature. There is thus obtained a composition having the aroma of roast meat which is suitable for the seasoning of gravies.

EXAMPLE V

The following mixture is warmed to 45° C. and emulsified in a high pressure homogenizer:

| | Kg. |
|---|---|
| Aqueous concentrate of Example 3 | 54.58 |
| Fat of Example 3 | 20.00 |
| Leek extract produced according to German application 1,927,228 | 3.00 |
| Mushroom extract produced in the same manner as the leek extract | 2.50 |
| Tomato concentrate, double | 10.00 |
| Raw onion aroma, as in Example IV | 2.50 |
| Paprika extract, as in Example IV | 2.00 |
| Chili extract | 0.10 |
| White pepper extract | 0.10 |
| Yeast extract | 5.10 |
| Protein hydrolysate | 0.10 |
| Caraway oil | 0.02 |
| | 100.00 |

The mixture is heated in an autoclave to 130° C. maintained at this temperature for 15 minutes and then quickly cooled to room temperature.

The obtained aromatic composition has a seasoned roast goulash aroma which makes it particularly suitable as an addition to goulash gravies and soups. The composition is stable at room temperatures for several months.

The liquid aromatic can be converted into a powder by a drying process. To aid in the drying and to increase the storage stability it is suitable before the drying to add hydrocolloids, such as starches, gum arabic, dextrin and gelatin, or types of sugars, starch syrups, etc.

While the invention has been described in particular with respect to the production of specific aromatics, it is to be understood that variations and modifications of the invention can be made without departing from the spirit or scope of the invention.

What is claimed is:

1. Method of producing a concentrated aromatic meat product, which comprises forming a pasty, pumpable mass of comminuted animal portions and water, heating the thus-obtained pasty mass in an autoclave at a temperature of between about 95° C. and 128° C. for about 35–120 minutes, cooling the resulting mass to a temperature of between about 35° C.–70° C., separating the solids from the liquids, treating the liquid phase with a protein splitting enzyme in an amount and for a time sufficient to partially decompose the gelatinizing proteins and such that the subsequently extracted aqueous phase can be concentrated to 60–85% nonaqueous constituents, separating the protein-splitting enzyme-treated liquid phase from fat contained therein, heating said liquid phase to a sufficiently high temperature and for a time sufficient to effect uperization, and concentrating, thereby obtaining a concentrated aromatic of meat characteristics.

2. Method according to claim 1 wherein the fat content of the pasty mass is adjusted to be between about 10% and 20% by weight of said mass.

3. Method according to claim 1 wherein the heated pasty mass is cooled to a temperature of between about 50° C. and 55° C.

4. Method according to claim 1 wherein the enzyme treatment is continued until the aqueous extract can be concentrated to 74–78% nonaqueous constituents which is flowable at about 20° C.

5. Method according to claim 4 wherein the enzyme treatment is carried out at a temperature of about 35–70° C.

6. Method according to claim 1 wherein the enzyme treatment is carried out at a temperature of about 35–70° C. for between about 30 and 60 minutes.

7. Method according to claim 1 wherein the aqueous phase after the enzyme treatment is heated to a temperature of between about 145° and 160° C. to effect uperization.

8. Method according to claim 1 wherein the finally obtained aqueous concentrate is emulsified with fat and the thus-obtained emulsion is dried.

9. Method according to claim 1 wherein the finally obtained aqueous concentrate is emulsified with fat, heated to a temperature between about 100–150° C., quickly cooled and then dried.

10. Method according to claim 1 wherein the thus-obtained aqueous concentrate is mixed with an aromatic concentrate selected from the group consisting of vegetable aromatics and seasonings and emulsified with fat, the thus-obtained emulsion is heated to a temperature between about 100–150° C., quickly cooled and dried.

11. Concentrated aromatic meat product obtained by the method of claim 1.

12. A dried aromatic meat product obtained by drying the concentrated aromatic meat product of claim 13.

References Cited

UNITED STATES PATENTS

| 3,348,954 | 10/1967 | Green | 99—140 R |
| 3,368,906 | 2/1968 | Coffin et al. | 99—110 |
| 3,645,753 | 2/1972 | Gasser | 99—110 |

HYMAN LORD, Primary Examiner

U.S. Cl. X.R.

426—369, 364, 471, 211, 212